US006998269B2

(12) United States Patent
Kristen et al.

(10) Patent No.: US 6,998,269 B2
(45) Date of Patent: Feb. 14, 2006

(54) DETERMINATION OF THE QUALITY OF POLYMERIZATION CATALYSTS

(75) Inventors: Marc Oliver Kristen, Limburgerhof (DE); Peter Eibeck, Ludwigshafen (DE); Heike Gregorius, Koblenz (DE); Dieter Lilge, Limburgerhof (DE)

(73) Assignee: Basell Polyolefine GmbH, Frankfurt am Main (DE)

( * ) Notice: Subject to any disclaimer, the term of this patent is extended or adjusted under 35 U.S.C. 154(b) by 273 days.

(21) Appl. No.: 10/359,239

(22) Filed: Feb. 6, 2003

(65) Prior Publication Data

US 2003/0166799 A1 Sep. 4, 2003

(30) Foreign Application Priority Data

Feb. 19, 2002 (DE) ............................... 102 06 988

(51) Int. Cl.
*G01N 31/00* (2006.01)
(52) U.S. Cl. .................. 436/37; 422/68.1; 526/65; 702/30
(58) Field of Classification Search ................. 526/59, 526/60, 65; 702/30; 436/37; 422/68.1
See application file for complete search history.

(56) References Cited

U.S. PATENT DOCUMENTS 6,406,632 B1 * 6/2002 Safir et al. .................. 210/656
6,503,993 B1 * 1/2003 Huovinen et al. ....... 526/348.1

FOREIGN PATENT DOCUMENTS

| WO | 98/03521 | 1/1998 |
| WO | 99/51980 | 10/1999 |
| WO | 00/40331 | 7/2000 |
| WO | 01/36087 | 5/2001 |

OTHER PUBLICATIONS

Angew.Chem.Int.Ed.Eng.2000,39,4367.
Angew.Chem.Int.Ed.Eng.1998,37,3272.
Produktdokumentation Chemspeed, May 23, 2001, Fully automated Synthesis Workstation ASW 2000 P for reactions under pressure, XP002239213.
Boussie et al., *Tetrahedron*, 55:30, Sep. 24, 1999, p. 11699-11710.
Jandeleit et al., *Angew, Chemie*, 1999, p. 2495-2532.

* cited by examiner

*Primary Examiner*—Fred Teskin
(74) *Attorney, Agent, or Firm*—Novak Druce & Quigg

(57) ABSTRACT

A method of determining the quality of polymerization catalysts comprises
a) provision of the catalysts,
b) polymerization of a monomer using these catalysts,
c) isolation of the polymers obtained in b),
d) characterization of the polymers,
wherein the method is carried out in an assembly of n vessels in an essentially automated fashion, where the steps a) to d) are all carried out in parallel or are all carried out sequentially or some of the steps a) to d) are carried out in parallel and the remainder are carried out sequentially and n is a natural number greater than or equal to 2.

16 Claims, No Drawings

DETERMINATION OF THE QUALITY OF POLYMERIZATION CATALYSTS

The present invention relates to a method of determining the quality of polymerization catalysts, an apparatus for the essentially automated determination of the quality of polymerization catalysts and the use of an apparatus for determining the quality of polymerization catalysts, and also an apparatus for the essentially automated determination of soluble and insoluble polymer fractions.

The use of metallocene catalysts (catalytically active mixture of metallocene complexes and cocatalysts) in polymerization, particularly in olefin polymerization, has been known for a relatively long time. In most polymerization cases carried out industrially, the complexes are used not as dissolved catalysts but as catalysts applied to support materials (e.g. silica gel).

Testing of the quality of metallocene catalysts has hitherto been carried out by applying the catalysts to a support material, subsequently polymerizing particular monomers, e.g. 1-alkenes, under high pressure and gaining information on the polymerization properties, for example stereoselectivity, of the catalyst by means of particular physical parameters of the polymer, and thus assessing its quality.

For example, the racemic form of a chiral metallocene catalyst used in propylene polymerization gives virtually exclusively the desired isotactic polypropylene, while the meso form of the chemically identical metallocene catalyst gives the undesired atactic polypropylene. Such metallocene catalysts are usually in the form of mixtures in which the racemic and meso forms are present in particular ratios.

It is thus possible to draw conclusions as to the quality of a metallocene catalyst from the stereochemistry of the polymer (isotacticity or atacticity), for example of polypropylene, produced using the metallocene catalyst.

One method of determining the content of isotactic polypropylene in propylene polymers is determination of the xylene-soluble material in accordance with ASTM D 5492-98 and EN ISI 6427. As characteristic parameter, the XS values are determined. A large XS value indicates low isotacticity and thus low catalyst quality.

The above-described tests for determining the catalyst quality have the disadvantage that they are very complicated because relatively large amounts of material have to be handled in relatively large apparatuses. Polymerization and analysis can often only be carried out successively and in small number and it takes a long time before a final conclusion as to the quality of a catalyst can be drawn. This is particularly disadvantageous when the quality of the polymerization catalysts has to be tested quickly and reliably during commercial polymerizations.

The literature describes parallel polymerizations using various catalysts (cf., for example, Angew. Chem., Int. Ed. Eng. 2000, 39, 4367; Angew. Chem., Int. Ed. Eng. 1998, 37, 3272, WO 98/03521), although in those references specific types of catalysts or catalysts which are covalently bound to a support are used. The experiments described can, however, only be used for finding new catalyst structures.

Quality testing of previously developed catalysts at high sample throughput is not described.

It is an object of the present invention to find a method which makes it possible for the quality of many catalyst samples for catalyzing polymerizations to be evaluated quickly and inexpensively without it being necessary, as in the past, to polymerize each catalyst sample individually on a relatively large scale and analyze the resulting polymer in comparatively large batches.

We have found that this object is achieved by a method of determining the quality of polymerization catalysts, which comprises
a) provision of the catalysts,
b) polymerization of a monomer using these catalysts,
c) isolation of the polymers obtained in b),
d) characterization of the polymers, wherein the method is carried out in an assembly of n vessels in an essentially automated fashion, where the steps a) to d) are all carried out in parallel or are all carried out sequentially or some of the steps a) to d) are carried out in parallel and the remainder are carried out sequentially and n is a natural number greater than or equal to 2, an apparatus for the essentially automated determination of the quality of polymerization catalysts, consisting essentially of A) a synthesis module and B) an analytical module for determining soluble and insoluble polymer fractions, where A) and/or B) each comprise at least four vessels and the respective cumulated volume of the vessels of A) or B) is in each case not greater than 100000 ml, and the use of this apparatus for determining the quality of polymerization catalysts.

Synthesis modules A) are known and are commercially available. They generally comprise a plurality of reaction vessels, usually from 4 to 300, preferably from 12 to 96, which can be placed under superatmospheric pressure, usually from 1 to 100 bar, preferably from 10 to 50 bar. The reaction vessels are generally cylindrical vessels made of glass or metal, in the latter case preferably stainless steel. The cumulated volume (number of reaction vessels×volume of the individual reaction vessels) of the reaction vessels of the module A) is not more than 100000 ml, preferably from 50 to 10000 ml and in particular from 200 to 2500 ml. The individual vessels of the module A) usually each have a volume of from 5 to 100 ml, preferably from 10 to 75 ml. Furthermore, synthesis modules A) generally further comprise metering, stirring and/or shaking devices, heating and/or cooling facilities and a control unit for these functions. Examples of such synthesis modules are the automatic apparatuses supplied by Chemspeed, Augst, Switzerland, preferably the ASW 2000 models, in particular the model ASW 2000P.

The analytical module B), viz. the apparatus for the essentially automated determination of the soluble and insoluble polymer fractions, comprises a preparation unit having from 4 to 300, preferably from 12 to 96, vessels, a heatable plate for dissolving the polymers into which the preparation unit can be inserted, a coolable plate for precipitating insoluble polymers into which the preparation unit can be inserted, a filtration unit for separating the dissolved polymer from the undissolved polymer, an evaporation unit for isolating the dissolved polymer and a weighing unit for determining the proportion of dissolved material.

In the analytical module B), preference is given to determining xylene-soluble and xylene-insoluble polymer fractions, preferably of propylene homopolymers and/or copolymers, thus giving the XS value as measured value. The following method has been found to be well suited for this purpose. To produce homogeneous polymer solutions, specific glass vessels (conical-shoulder vessels) having a volume of from 50 to 500 ml, preferably 150 ml, and provided with an air condenser are used. The air condenser is generally at least 15 cm, preferably 25 cm, long and generally has an internal diameter of from 5 to 25 mm, preferably 10 mm. It can be made of glass, metal or a thermally conductive plastic. The polymers to be examined and the organic solvent (preferably an aromatic solvent, particularly preferably xylene (including isomer mixtures thereof) and ethylbenzene) are placed in the glass vessels, a magnetic stirrer bar is added and the air condensers are placed on the glass vessels. Such an experimental arrangement will hereinafter be referred to as an XS unit.

In general, a plurality of these XS units are inserted in a heatable plate. Mixing in all XS units is generally achieved by means of magnetic stirrers which are integrated into the heatable plate. The temperature of the heatable plate is set so that the solvent begins to boil. After an appropriate time, which is typically from 10 to 360 minutes, preferably from 20 to 40 minutes, the polymer has dissolved. To reprecipitate the polymer, the XS unit is inserted into the coolable plate whose temperature is, on the basis of standard methods, generally set to 25° C.

To accelerate the crystallization, the XS unit can alternatively be placed in a plate which is maintained at 0–10° C., preferably 5° C. After the XS unit has come to the set temperature after 5–20 minutes, it is transferred to a third plate which has a temperature of from 15 to 30° C., preferably from 19.5 to 25.5° C.

In these procedures, the XS units can be simply and quickly transferred by hand or by means of an automatic transport device from one plate to another. 10 or more XS units can be transferred at once. The number of XS units per analysis is determined only by the chosen size of the plates.

As next step, the cooled solutions are filtered and the filtrate is placed in a tared vessel (e.g. a glass vessel). The filtrations can be carried out either in parallel or sequentially. The vessels are then transferred to an IR Dancer (from Hett-Lab AG, Switzerland) where the solvent is removed in parallel (from 10 to 100 vessels, preferably from 12 to 48) under reduced pressure (from 800 to 200 mbar) while heating by means of IR lamps. When more than 95%, preferably more than 99%, of the solvent has been removed, the pressure is generally set to less than 50 mbar. During the entire time, a temperature of from 70 to 200° C., preferably from 100 to 130° C., is set in the IR Dancer. After from 15 to 360 minutes, preferably from 20 to 30 minutes, drying is stopped and the vessels are weighed again to determine the XS values. The difference between this weighing and the tare weighing of the vessels gives the amount of soluble material which on division by the mass of the test portion of polymer gives the XS value in percent.

"In parallel" means that a unit operation or a plurality of unit operations, for example filling, polymerization, heating, etc., within the steps a) to d) is carried out virtually simultaneously in all vessels of the respective module A) and/or B).

"Sequentially" means that a unit operation or a plurality of unit operations, for example filling, polymerization, heating, etc., within the steps a) to d) is carried out sequentially from vessel to vessel of the respective module A) and/or B).

The unit operations in the steps b) and/or c) and/or, if desired, d) of the method of the present invention are preferably carried out in parallel. Very particular preference is given to carrying out the unit operations in the steps b) and d) in parallel.

The following process variant is useful: polymerization is carried out in an apparatus which comprises 12 reaction vessels and makes it possible for polymerizations to be carried out in parallel (hereinafter referred to as parallel reactor). The active catalysts are generally prepared directly in the parallel reactor or are produced by reacting the catalyst precursors (e.g. metallocene complex) with a suitable activator in the parallel reactor. A specific amount of the active catalyst is subsequently introduced, usually by means of an automatic metering unit, into the respective polymerization reactor, either sequentially or preferably virtually simultaneously (in parallel).

The catalyst samples are preferably a number of different batches of one catalyst but it is also possible for tests on various catalysts to be combined within a test run.

The catalyst solutions or suspensions are then admixed virtually simultaneously (in parallel) with the monomer (whose state of matter is not critical), if appropriate heated and the polymerizations are thus carried out in parallel. Preferred monomers are ethylene and/or propylene. The polymerization can be carried out either under atmospheric pressure or under superatmospheric pressure. Preferred catalysts are catalysts for preparing polyolefins, particularly preferably metallocene catalysts.

After the polymerization, the polymer obtained is isolated, for example by filtration and drying, weighed and the activity of the catalyst is thus calculated according to the formula yield of polymer (kg)/(amount of catalyst (mol)* time (h)).

In addition, it is possible to determine further important polymer properties. This is, preferably in the case of polypropylene production, preferably the determination of the proportion of soluble material (e.g. in xylene), since this enables, for example, the rac/meso ratio of a metallocene catalyst to be determined. For the determination of the XS value according to the present invention (high-throughput XS determination), the above-described apparatus (module B)) and the method described there are preferably used.

Possible transition metal components for the polymerization catalysts are, for example, the nickel and palladium complexes described in WO 96/23010, the iron and cobalt complexes described in WO 98/27124, WO 98/30612, WO 99/12981 and WO 00/50470, the chromium complexes described in WO 00/58370 and WO 01/12641 and also other transition metal complexes as described in Angewandte Chemie 1999, 111, p. 448, Chem Rev. 2000, 100, 1169, Coord. Chem. Rew. 2000, 203, 325, preferably metallocenes.

For the purposes of the present invention, metallocene catalysts are all catalyst systems which comprise at least one metallocene compound. Metallocenes are, for the present purposes, all complexes of transition metals with organic ligands which together with compounds capable of forming metallocenium ions give active catalyst systems.

Metallocene catalysts which are suitable for the purposes of the present invention generally comprise as active constituents A) at least one metallocene complex of the formula (I)

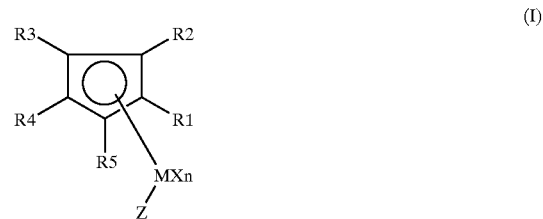

where the substituents and indices have the following meanings:

M is titanium, zirconium, hafnium, vanadium, niobium or tantalum or an element of transition group III of the Periodic Table or the lanthanides, X is fluorine, chlorine, bromine, iodine, hydrogen, C1–C10-alkyl, C6–C15-aryl, alkylaryl having from 1 to 10 carbon atoms in the alkyl part and from 6 to 20 carbon atoms in the aryl part, —OR6 or —NR6R7, n is 1, 2 or 3 and corresponds to the valence of M minus 2, where R6 and R7 are each C1–C10-alkyl, C6–C15-aryl, alkylaryl, arylalkyl, fluoroalkyl or fluoroaryl each having from 1 to 10 carbon atoms in the alkyl radical and from 6 to 20 carbon atoms in the aryl radical and the radicals X are identical or different, R1 to R5 are each hydrogen, C1–C10-alkyl, 5- to 7-membered cycloalkyl which may in turn bear C1–C10-alkyl groups as substituents, C6-C15-aryl or arylalkyl, where two adjacent radicals may also together form a saturated or unsaturated cyclic group having from 4 to 15 carbon atoms, or Si(R8)$_3$ where R8 can be C1–C10-alkyl, C3–C10-cycloalkyl or C6–C15-aryl and Z is as defined for X or is

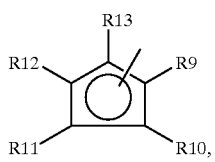

where the radicals

R9 to R13 are each hydrogen, C1–C10-alkyl, 5- to 7-membered cycloalkyl which may in turn bear C1–C10-alkyl groups as substituents, C6–C15-aryl or arylalkyl and two adjacent radicals may also together form a saturated or unsaturated cyclic group having from 4 to 15 carbon atoms, or Si(R14)$_3$ where R14 is C1–C10-alkyl, C3–C10-cycloalkyl or C6–C15-aryl, or the radicals R4 and Z together form an -R15-A- group, where =BR16, =AlR16, —Ge—, —Sn—, —O—, —S—, =SO, =SO2,
=NR16, =CO, =PR16 or =P(O)R16,

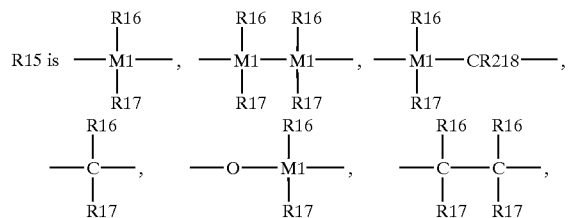

where

R16, R17 and R18 are identical or different and are each a hydrogen atom, a halogen atom, a C1–C10-alkyl group, a C1–C10-fluoroalkyl group, a C6–C10-fluoroaryl group, a C6–C10-aryl group, a C1–C10-alkoxy group, a C2–C10-alkenyl group, a C7–C40-arylalkyl group, a C8–C40-arylalkenyl group or a C7–C40-alkylaryl group or two adjacent radicals together with the atoms connecting them can form a saturated or unsaturated ring having from 4 to 15 carbon atoms, and M1 is silicon, germanium or tin,

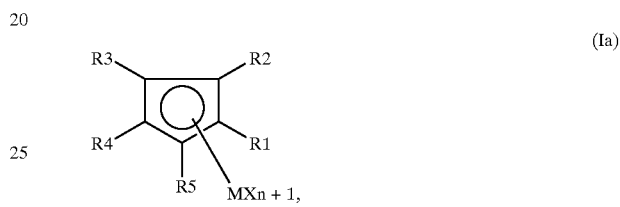

where

R19 is C1–C10-alkyl, C6–C15-aryl, C3–C10-cycloalkyl, C7–C18-alkylaryl or Si(R20)$_3$, R20 is hydrogen, C1–C10-alkyl, C6–C15-aryl which may in turn bear C1–C4-alkyl groups as substituents or C3–C10-cycloalkyl or the radicals R4 and R12 together form an -R15- group.

The radicals X in the formula (I) are preferably identical.

Among metal complexes of the formula (I), preference is given to

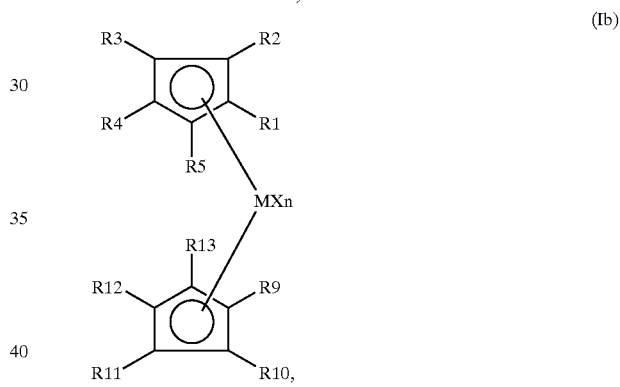

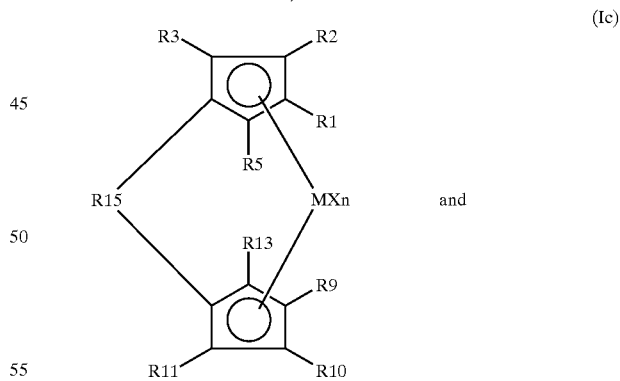

and

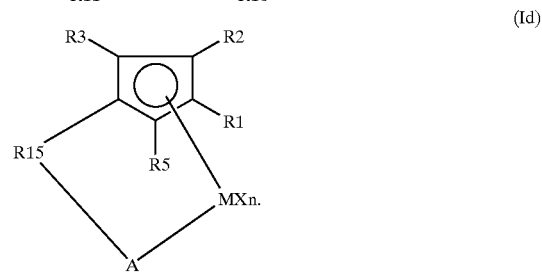

Among compounds of the formula (Ia), particular preference is given to those in which
M is titanium, zirconium or hafnium,
X is chlorine, C1–C4-alkyl or phenyl,
n is 2 and
R1 to R5 are each hydrogen or C1–C4-alkyl.

Among the compounds of the formula (Ib), preference is given to those in which
M is titanium, zirconium or hafnium,
X is chlorine, C1–C4-alkyl or phenyl,
n is 2,
R1 to R5 are each hydrogen, C1–C4-alkyl or Si(R8)$_3$ and
R9 to R13 are each hydrogen, C1–C4-alkyl or Si(R14)$_3$.

Particularly useful compounds of the formula (Ib) are those in which the cyclopentadienyl radicals are identical.

Examples of particularly suitable compounds are, inter alia:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride and also the corresponding dimethylzirconium compounds.

Particularly suitable compounds of the formula (Ic) are those in which
R1 and R9 are identical and are each hydrogen or C1–C10-alkyl groups,
R5 and R13 are identical and are each hydrogen, a methyl group, an ethyl group, an isopropyl group or a tert-butyl group,
R3 and R11 are each C1–C4-alkyl and
R2 and R10 are each hydrogen or two adjacent radicals R2 and R3 and/or R10 and R11 in each case together form a saturated or unsaturated cyclic group having from 4 to 12 carbon atoms,

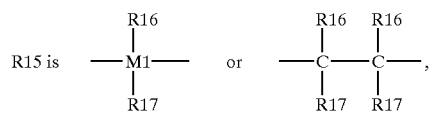

M is titanium, zirconium or hafnium and
X is chlorine, C1–C4-alkyl or phenyl.

Examples of particularly suitable complexes (Ic) are, inter alia:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)-zirconium dichloride,
dimethylsilanediylbis(3-tert-butyl-5-ethylcyclopentadienyl)-zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)-zirconium dichloride,
dimethylsilanediylbis(3-ethyl-5-isopropylcyclopentadienyl)-zirconium dichloride,
dimethylsilanediylbis(2-ethylindenyl)zirconium dichloride,
dimethylsilanediylbis(2-methyl-4,5-benzindenyl)zirconium dichloride
dimethylsilanediylbis(2-ethyl-4,5-benzindenyl)zirconium dichloride
methylphenylsilanediylbis(2-methyl-4,5-benzindenyl)-zirconium dichloride,
methylphenylsilanediylbis(2-ethyl-4,5-benzindenyl)-zirconium dichloride,
diphenylsilanediylbis(2-methyl-4,5-benzindenyl)zirconium dichloride,
diphenylsilanediylbis(2-ethyl-4,5-benzindenyl)zirconium dichloride and diphenylsilanediylbis(2-methylindenyl)hafnium dichloride and also the corresponding dimethylzirconium compounds.

Further examples of suitable complexes are, inter alia:
dimethylsilanediylbis(2-methyl-4-phenylindenyl)zirconium dichloride,
dimethylsilanediylbis(2-methyl-4-naphthylindenyl)zirconium dichloride,
dimethylsilanediylbis(2-methyl-4-isopropylindenyl)zirconium dichloride,
dimethylsilanediylbis(2-methyl-4,6-diisopropylindenyl)zirconium dichloride,
dimethylsilanediylbis(2-methyl-4[4'-tert-butylphenyl]indenyl)-zirconium dichloride,
dimethylsilanediylbis(2-ethyl-4[4'-tert-butylphenyl]indenyl)-zirconium dichloride,
dimethylsilanediylbis(2-propyl-4[4'-tert-butylphenyl]indenyl)-zirconium dichloride and
dimethylsilanediyl(2-isopropyl-4[4'-tert-butylphenyl]indenyl)-(2-methyl-4[4'-tert-butylphenyl]indenyl)zirconium dichloride and also the corresponding dimethylzirconium compounds.

Particularly useful compounds of the formula (Id) are those in which
M is titanium or zirconium,
X is chlorine, C1–C4-alkyl or phenyl,

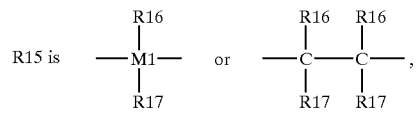

and

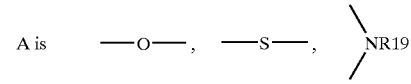

R1 to R3 and R5 are each hydrogen, C1–C10-alkyl, C3–C10-cycloalkyl, C6–C15-aryl or Si(R8)$_3$, or two adjacent radicals form a cyclic group having from 4 to 12 carbon atoms.

The synthesis of such complexes can be carried out by methods known per se, preferably by reaction of the appropriately substituted, cyclic hydrocarbon anions with halides of titanium, zirconium, hafnium, vanadium, niobium or tantalum.

Examples of appropriate preparative methods are described, for example, in Journal of Organometallic Chemistry, 369 (1989), 359–370.

It is also possible to use mixtures of various metallocene complexes as component A).

In addition, the metallocene catalysts further comprise at least one compound capable of forming metallocenium ions as component B).

Suitable compounds B) capable of forming metallocenium ions are, for example, strong, uncharged Lewis acids, ionic compounds having Lewis-acid cations or ionic compounds having Brönsted acids as cations.

As strong, uncharged Lewis acids, preference is given to compounds of the formula (II)

$$M2X1X2X3 \qquad (II)$$

where

M2 is an element of main group III of the Periodic Table, in particular B, Al or Ga, preferably B, X1, X2 and X3 are each hydrogen, C1–C10-alkyl, C6–C15-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula (II), in which X1, X2 and X3 are identical, preferably tris(pentafluorophenyl)borane.

Suitable ionic compounds having Lewis-acid cations are compounds containing cations of the formula (III)

$$[Ya+)Q_1Q_2 \cdots {}^{Q2}]^{d+} \qquad (III)$$

where

Y is an element of main groups I to VI or of transition groups I to VIII of the Periodic Table, Q1 to Q2 are singly negatively charged radicals such as C1–C28-alkyl, C6–C15-aryl, alkylaryl, arylalkyl, haloalkyl, haloaryl each having from 6 to 20 carbon atoms in the aryl radical and from 1 to 28 carbon atoms in the alkyl radical, C3–C10-cycloalkyl which may bear C1–C10-alkyl groups as substituents, halogen, C1–C28-alkoxy, C6–C15-aryloxy, silyl or mercapto groups, a is an integer from 1 to 6 and z is an integer from 0 to 5, d corresponds to the difference a–z but is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Ionic compounds having Brönsted acids as cations and preferably likewise noncoordinating counterions are mentioned in WO 91/09882; the preferred cation is N,N-dimethylanilinium.

The amount of strong, uncharged Lewis acids, ionic compounds having Lewis-acid cations or ionic compounds having Brönsted acids as cations is preferably from 0.1 to 10 equivalents, based on the metallocene complex A).

Particularly useful compounds B) capable of forming metallocenium ions are open-chain or cyclic aluminoxane compounds of the formula (IV) or (V)

where R21 is a C1–C4-alkyl group, preferably a methyl or ethyl group, and m is an integer from 5 to 30, preferably from 10 to 25.

The preparation of these oligomeric aluminoxane compounds is usually carried out by reacting a solution of trialkylaluminum with water and is described, for example in EP-A 284 708 and U.S. Pat. No. 4,794,096.

The oligomeric aluminoxane compounds obtained in this way are generally in the form of mixtures of both linear and cyclic chain molecules of various lengths, so that m should be regarded as a mean. The aluminoxane compounds can also be present in admixture with other metal alkyls, preferably aluminum alkyls.

It has been found to be advantageous to use the metallocene complexes A) and the oligomeric aluminoxane compounds of the formula (IV) or (V) in such amounts that the atomic ratio of aluminum from the oligomeric aluminoxane compounds to the transition metal from the metallocene complexes is in the range from 10:1 to $10^6$:1, in particular in the range from 10:1 to $10^4$:1.

Furthermore, aryloxyaluminoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279 or mixtures thereof can be used as component B) in place of the aluminoxane compounds of the formula (IV) or (V).

Suitable compounds B) capable of forming metallocenium ions also include the boron-aluminum compounds disclosed in WO 99/06414, for example di[bis(pentafluorophenylboroxy)]methylalane. The boron-aluminum compounds can also be used as supported catalysts on an organic or inorganic support.

Both the metallocene complexes A) and the compounds B) capable of forming metallocenium ions are preferably used in solution, with particular preference being given to using aromatic hydrocarbons having from 6 to 20 carbon atoms, in particular xylenes and toluene, as solvents.

Suitable metallocene catalysts can further comprise, as additional component C), a metal compound of the formula (VI)

$$M3(R22)r(R23)s(R24)t \qquad (VI)$$

where

M3 is an alkali metal, an alkaline earth metal or a metal of main group III of the Periodic Table, i.e. boron, aluminum, gallium, indium or thallium, R22 is hydrogen, C1–C10-alkyl, C6–C15-aryl, alkylaryl or arylalkyl each having from 1 to 10 carbon atoms in the alkyl part and from 6 to 20 carbon atoms in the aryl part, R23 and R24 are each hydrogen, halogen, C1–C10-alkyl, C6–C15-aryl, alkylaryl, arylalkyl or alkoxy each having from 1 to 10 carbon atoms in the alkyl radical and from 6 to 20 carbon atoms in the aryl radical, r is an integer from 1 to 3 and s and t are integers from 0 to 2, where the sum r+s+t corresponds to the valence of M3.

Among the metal compounds of the formula (VI), preference is given to those in which M3 is lithium, magnesium or aluminum and R23 and R24 are each C1–C10-alkyl.

Particularly preferred metal compounds of the formula (VI) are n-butyllithium, n-butyl-n-octylmagnesium, n-butyl-n-heptylmagnesium, tri-n-hexylaluminum, triisobutylaluminum, triethylaluminum and trimethylaluminum.

If a metal compound C) is used, it is preferably present in the catalyst system in such an amount that the molar ratio of M3 from formula (VI) to transition metal M from formula (I) is from 800:1 to 1:1, in particular from 500:1 to 50:1.

In a particular embodiment, supported catalysts, in particular supported metallocene catalysts, are used.

As support materials, particular preference is given to using finely divided, porous supports which generally have a particle diameter in the range from 1 to 300 µm, in particular from 20 to 90 µm. Suitable support materials are, for example, inorganic oxides of silicon, of aluminum, of titanium or of a metal of main group I or II of the Periodic Table or mixtures of these oxides; among these, preference is given to aluminum oxide, magnesium oxide, sheet silicates and, in particular, silica gel.

The nature of the monomers is not critical. It is usual to employ olefins such as C2–C40-olefins which may be linear, branched or cyclic, preferably C2–C10-alk-1-enes such as ethylene, propylene, 1-butene, 1-hexene, 1-octene; vinylaromatic compounds, preferably C8–C20-vinylaromatics such as styrene, p-methylstyrene or p-methoxystyrene.

The process conditions for the polymerization of such monomers in the presence of the catalysts described are also not critical and are generally known. Pressures in the range from 1 to 3000, preferably from 5 to 80 bar, and temperatures in the range from 0 to 300° C., preferably from 60 to 120° C., are useful.

The present invention achieves the object defined at the outset in that relevant properties can be determined in a short time on a large number of catalyst or polymer samples (high-throughput method). The results obtained in this way make it possible to draw statistically based conclusions as to the catalyst quality.

The informative power of this method cannot be achieved by conventional, analogous individual polymerization tests which are more time-consuming and require larger quantities of materials. The present invention is therefore employed, in particular, when reliable data on catalyst quality have to be obtained in a short time, for example in large-scale production of polymers using the above-described catalysts or for release of these catalysts for such polymer production.

EXAMPLES

All experiments were carried out with exclusion of air and moisture, and all apparatus and reagents were prepared accordingly. The xylene-soluble fraction (XS) in polypropylene was determined by a method analogous to ASTM D5492-98.

Application of the Catalyst to a Support (General Method):

a) Treatment of the Support

In a 250 ml flask, 10.5 g of silica gel (Sylopol 2107 (from Grace), baked at 180° C. and 1 mbar for 8 hours) were suspended in 50 ml of toluene. 10.5 ml of MAO solution (30% strength in toluene) were added dropwise over a period of 30 minutes. After stirring for one hour, the mixture was filtered and the residue was washed with toluene. It was subsequently dried until it was free-flowing. Yield: 14 g.

b) Loading

A solution of 365 mg (600 µmol) of dimethylsilyl(bis(2-methylbenz[e]indenyl))zirconium dichloride in 43 ml of toluene and 21 ml of MAO solution (30% strength in toluene) was prepared by placing the metallocene in a vessel and then adding the toluene and then the MAO solution. The mixture was then stirred for one hour. This solution was added to the pretreated silica gel from a) which had been placed on a frit, and the silica gel was impregnated for 30 minutes. The solvent was then allowed to run off and the material on the frit was stirred with a spatula when the solvent surface reached the silica gel surface. After stirring, the material was allowed to stand for one hour, the remaining solvent was then pushed through by means of nitrogen and the solid was dried to constant weight in a stream of nitrogen.

Yield: 22 g of an orange solid. (60 µmol of Zr/g of $SiO_2$)

Using this general method, five supported catalyst batches (OP 346 to OP 350) were produced from the batches OP 346 to OP 350 of the metallocene complex.

Propylene polymerization (general method): Comparative experiment on a "large scale"

4 mmol of triisobutylaluminum (2 molar in heptane) were placed in a 1 l steel autoclave. 600 ml of propylene were then condensed in at room temperature. The stirrer was switched on. 60 mg of the catalyst prepared as described in b) were then blown in by means of argon via a lock. 6 mg of Atmer 163 (from Ciba) (10% strength solution in heptane) were subsequently added, likewise via a lock.

The mixture was heated to 65° C. After 60 minutes, the polymerization reaction was stopped by venting and the polypropylene was isolated as a white powder. The XS value was determined in a conventional fashion in 500 ml batches in accordance with ASTM D 5492–98. The time required for this was 60 minutes per sample.

Using the above general method, the five supported catalyst batches OP 346 to OP 350 (see above) were employed for the polymerization (for results, see table below).

Metallocene (dimethylsilyl(bis(2-methylbenz[e]indenyl)) zirconium dichloride) batch tests: polymerization using the supported catalyst in a 1 l autoclave

| Batch | Productivity (g of polymer/g of cat.) | XS (%) |
| --- | --- | --- |
| OP 346 | 3600 | 1.0 |
| OP 347 | 4800 | 0.9 |
| OP 348 | 3800 | 0.6 |
| OP 349 | 4650 | 1.0 |
| OP 350 | 3950 | 0.8 |

Homogeneous polymerization in a Chemspeed reactor (ASW 2000) (general procedure):

In a typical experiment, 3 reactor blocks each having 4×75 ml double-wall reactors with reflux condenser were used. Before introduction of the reagents, the reactors were baked out in an automated procedure and flushed with argon. The further steps were carried out with exclusion of air and moisture.

The procedure for carrying out an experiment is described below. The other experiments of a test run are carried out virtually simultaneously (in parallel).

15000 µl of toluene were introduced into the reactor, followed by 42 µl of a 30% strength solution of MAO in toluene. 200 ml of a toluene solution of the metallocene and MAO (5 µmol/l or 1500 µmol/l) were subsequently added. The reaction mixture was heated to 50° C.

The polymerization was started by brief evacuation and introduction of gaseous propylene. During the reaction time of 10 minutes, monomer which had been consumed was continuously replaced. The reaction was then stopped by quenching with 15000 µmol of a methanolic HCl solution.

The following manual unit operations were carried out virtually simultaneously (in parallel): samples were filtered off on a D4 frit, washed twice with acetone and dried at 80° C./1 mbar in a vacuum drying oven for 3 hours.

This gave 2.03 g of a white powder.

The supported catalyst batches OP 346 to OP 350 were used.

Further details of the polymerization may be found in the following table metallocene(dimethylsilyl(bis(2-methylbenz[e]indenyl))zirconium dichloride) batch tests in the Chemspeed reactor homogeneous polymerization in toluene/MAO 1 µmol of Zr, Al/Zr: 500, polymerization time: 10 minutes

| Batch | Activity (kg/mol * h) | | XS (%) | |
|---|---|---|---|---|
| | | Mean | | Mean |
| OP 346 | 8600 | 10300 | 1.6 | 1.5 |
| | 12000 | | 1.4 | |
| OP 347 | 12200 | 12450 | 1.1 | 1.15 |
| | 12700 | | 1.2 | |
| OP 348 | 11500 | 9250 | 0.9 | 1.1 |
| | 7000 | | 1.3 | |
| OP 349 | 12900 | 11750 | 1.4 | 1.35 |
| | 10600 | | 1.3 | |
| OP 350 | 7500 | 10000 | 1.6 | 1.5 |
| | 12500 | | 1.4 | |

The XS values were determined using the high-throughput method of the present invention in the apparatus B) of the present invention. Technical-grade xylene was used as solvent, the samples were cooled from 130° C. to 5° C. over a period of 15 minutes to induce crystallization and were then worked up as described above. The time required for the XS determination was 10 minutes per sample.

In a further experiment, various rac/meso mixtures of a metallocene ((dimethylsilyl(bis(2-methyl-4-phenylindenyl)) zirconium dichloride) were examined to determine the XS values. The rac/meso ratio was determined by 1H-NMR spectroscopy. The polymerizations were carried out in the Chemspeed reactor described above, and the XS values were determined using the high-throughput method of the present invention in the apparatus B) of the present invention.

| Batch | rac/meso ratio | average XS | XS 1 | XS 2 | XS 3 | XS 4 |
|---|---|---|---|---|---|---|
| 1 | 1.4:1 | 2.175 | 2.1 | 2.1 | 2.4 | 2.1 |
| 2 | 2.7:1 | 1.025 | 1.0 | 1.3 | 1.0 | 0.8 |
| 3 | 6.5:1 | 0.725 | 0.6 | 1.0 | 0.6 | 0.7 |
| 4 | <20:1 | 0.600 | x | 0.6 | x | x |
| 5 | >20:1 | 0.575 | 0.6 | 0.5 | 0.6 | 0.6 |
| 6 | >20:1 | 0.400 | x | 0.4 | 0.3 | 0.5 |
| 7 | >20:1 | 0.366 | x | 0.3 | 0.3 | 0.5 | x: value not determined because of mechanical problems
XS values in %

It can be seen that, for example, the XS value and/or the productivity of catalysts can be determined quickly using the method of the present invention. Furthermore, the method of the present invention gives a larger data set for statistical evaluation of relevant parameters, e.g. XS value or catalyst productivity. Statistically based information on the quality of catalysts can thus be obtained (rapid quality control of the catalysts).

We claim:

1. A method of determining the quality of polymerization catalyst, which comprises
   a) providing different batches of one a polymerization catalyst,
   b) polymerizing a monomer using these different baches of the catalyst,
   c) isolating the polymers obtained in b), and
   d) determining the quality of the catalyst batches by characterizing the isolated polymers obtained in c) by determining the proportion of xylene-soluble material (XS determination) and/or the polymerization activity,
wherein the method is carried out in an assembly of n vessels in an essentially automated fashion, where the steps a) to d) are all carried out in parallel or are all carried out sequentially or some of the steps a) to d) are carried out in parallel and the remainder are carried out sequentially and n is a natural number greater than or equal to 2.

2. A method as claimed in claim 1, wherein n is greater than or equal to 12.

3. A method as claimed in claim 1, wherein the steps b) and/or c) and/or optionally d) are carried out in parallel.

4. A method as claimed in claim 1, wherein the polymerization catalyst is a catalyst for the polymerization of olefins or vinylaromatic compounds.

5. A method as claimed in claim 1, wherein the polymerization catalyst is a metallocene catalyst.

6. An apparatus specifically adapted for the essentially automated determination of the quality of polymerization catalysts and consisting essentially of
   A) a synthesis module and
   B) an analytical module for determining xylene-soluble and xylene-insoluble polymer fractions,
where A) and/or B) each comprise at least four vessels and the respective cumulated volume of the vessels of A) or B) is in each case not greater than 100000 ml.

7. The apparatus defined in claim 6, wherein the analytical module (B) comprises
   a heatable plate for dissolving the polymer in an organic solvent,
   a coolable plate for precipitating insoluble fractions of the polymer from a heated solution of the polymer, and
   a filtration unit for separating precipitated insoluble fractions of the polymer and dissolved fractions of the polymer.

8. The apparatus defined in claim 7, wherein the analytical module (B) further comprises
an evaporation unit for separating the dissolved fractions of the polymer and the organic solvent, and
a weighing unit for determining the proportion of the dissolved fractions.

9. An apparatus specifically adapted for the essentially automated determination of soluble and insoluble plymer fractions which cormprises
an assembly of at least four vessels, wherein the cumulated volume of the vessels in not greater than 100000 ml,
heating and/or cooling facilities for each of these vessels, metering devices, stirring and/or shaking devices,
a control unit for these functions,
a heatable plate for dissolving the polymer in an organic solvent,
a coolable plate for precipitating insoluble fractions of the polymer from a heated solution of the polymer, and
a filtration unit for separating precipitated insoluble fractions of the polymer and dissolved fractions of the polymer.

10. The apparatus defined in claim 9, which further comprises
an evaporation unit for separating the dissolved fractions of the polymer and the organic solvent, and
a weighing unit for determining the proportion of the dissolved fractions.

11. A method as claimed in claim 1, wherein the isolated polymers obtained in c) are characterized by XS determination or by XS determination and determination of the polymerization activity.

12. A method of determining the quality of polymerization catalysts, which comprises
a) providing different polymerization catalysts,
b) polymerizing a monomer using these different catalysts,
c) isolating the polymers obtained in b), and
d) characterizing the isolated polymers obtained in c) by determining the proportion of xylene-soluble material (XS determination), or by XS determination and a determination of the polymerization activity,
wherein the method is carried out in an assembly of n vessels in an essentially automated fashion, where the steps a) to d) are all carried out in parallel or are all carried out sequentially or some of the steps a) to d) are carried out in parallel and the remainder are carried out sequentially and n is a natural number greater than or equal to 2.

13. A method as claimed in claim 12, wherein n is greater than or equal to 12.

14. A method as claimed in claim 12, wherein the steps b) and/or c) and/or optionally d) are carried out in parallel.

15. A method as claimed in claim 12, wherein the polymerization catalysts are catalysts for the polymerization of olefins or of vinylaromatic compounds.

16. A method as claimed in claim 12, wherein the catalysts are metallocene catalysts.

* * * * *

UNITED STATES PATENT AND TRADEMARK OFFICE
CERTIFICATE OF CORRECTION

PATENT NO.       : 6,998,269 B2
APPLICATION NO.  : 10/359239
DATED            : February 14, 2006
INVENTOR(S)      : Kristen et al.

It is certified that error appears in the above-identified patent and that said Letters Patent is hereby corrected as shown below:

Page 8, column 14, line 23, before "polymerization" insert --a--; and
    line 25, after "one" delete "a".

Signed and Sealed this

Twenty-ninth Day of August, 2006

JON W. DUDAS
*Director of the United States Patent and Trademark Office*